United States Patent [19]
Rejimbal, Jr. et al.

[11] Patent Number: 5,277,922
[45] Date of Patent: Jan. 11, 1994

[54] METHOD FOR THE PRESERVATION OF WHOLE CITRUS FRUIT

[75] Inventors: Theodore R. Rejimbal, Jr., Tangerine; Charles M. Gomez, Ocoee, both of Fla.

[73] Assignee: The Coca-Cola Company, Atlanta, Ga.

[21] Appl. No.: 891,365

[22] Filed: May 29, 1992

[51] Int. Cl.$^5$ .................................. D23B 7/00
[52] U.S. Cl. .................................. 426/333; 426/312; 426/320; 426/418; 426/419; 426/474; 426/506; 426/524; 426/616
[58] Field of Search ............ 426/333, 524, 419, 474, 426/312, 320, 616, 418, 506

[56] References Cited

U.S. PATENT DOCUMENTS

| Re. 31,023 | 9/1982 | Hall, III | 47/1 R |
|---|---|---|---|
| 496,376 | 4/1893 | Babbitt | 47/2 |
| 860,185 | 7/1907 | Bedford et al. | 426/524 |
| 1,050,707 | 1/1913 | Volney | 426/320 |
| 1,305,244 | 6/1919 | Bacon | 426/319 |
| 1,617,630 | 2/1927 | Gay | 426/524 |
| 1,797,606 | 3/1931 | Crider | 426/644 |
| 2,480,082 | 8/1949 | Lowry et al. | 99/194 |
| 2,930,707 | 3/1960 | Linnell et al. | 62/62 |
| 3,754,407 | 8/1973 | Tyree, Jr. | 62/55 |
| 3,815,377 | 6/1974 | Tyree, Jr. | 62/62 |
| 3,924,381 | 12/1975 | Sardo | 53/3 |
| 4,015,366 | 4/1977 | Hall, III | 47/1 R |
| 4,148,933 | 4/1979 | Janovtchik | 426/402 |
| 4,209,538 | 6/1980 | Woodruff | 426/314 |
| 4,320,995 | 3/1982 | Tennes et al. | 406/39 |
| 4,335,145 | 6/1982 | Stanley | 426/231 |
| 4,391,185 | 7/1983 | Stanley | 99/489 |
| 4,740,378 | 4/1988 | Jameson | 426/419 |
| 4,750,331 | 6/1988 | Barthelmes et al. | 62/62 |
| 4,940,599 | 7/1990 | Engler et al. | 426/524 |

OTHER PUBLICATIONS

Magazine Article, "Seeds of Sedation," *Discover*, Apr. 1990.
*Chemical Dictionary*, "Characteristics of Nitrous Oxide" (Date Unknown).
*Orlando Sentinel*, Article on Refrigerating Lemons, Apr. 27, 1989.
*Dictionary of Food Ingredients*, "Characteristics of Nitrous Oxide" (Date Unknown).

Primary Examiner—Helen F. Pratt
Attorney, Agent, or Firm—Willian Brinks Hofer Gilson & Lione

[57] ABSTRACT

A method for preserving fruits characterized by juice sacs and rag. The fruits are placed in a holding tank and submerged in a liquid having a freezing point higher than that of the fruits. The liquid may either be maintained just above its freezing point or frozen such that the temperature of the liquid is maintained above the freezing point of the fruits.

28 Claims, 2 Drawing Sheets

METHOD FOR THE PRESERVATION OF WHOLE CITRUS FRUIT

BACKGROUND OF THE INVENTION

The present invention relates generally to methods and devices for preserving whole citrus fruits and in particular whole oranges.

Citrus fruits, and in particular oranges, are a popular food throughout the world. Citrus fruits taste good, are nutritious, and are a good source of essential vitamins and minerals. Citrus fruits are used as food in many different ways. Citrus fruits, among other things, may be peeled and eaten whole, squeezed to make citrus juice, or included as ingredients in other food dishes. Because of their sensitivity to climatic conditions, citrus fruits grow only in the warmer regions of the world. Their popularity, however, necessitates their shipment to regions where they are not indigenous.

Citrus fruits are characterized by having juice sacs and rag (segment membranes). The rag separates the numerous juice sacs within each individual citrus fruit. Additionally, citrus fruits are best picked when ripe. Unlike many other fruits, citrus fruits afford little latitude for ripe harvesting; if they become overripe, citrus fruits experience a degradation in flavor. Thus, after being harvested, they must be quickly processed and/or transported to consumers before a deterioration in flavor occurs. Furthermore, citrus fruits are soft and easily bruised, and will spoil if kept in an overly warm environment. Thus, a method and apparatus for storing and preserving citrus fruits in a cool environment such that their food quality, flavor, and appearance does not deteriorate are necessary for consumer satisfaction.

A number of fruit-preserving methods have been devised, a few of which are discussed below. For example, a process for preserving olives is disclosed in U.S. Pat. No. 860,185 to Bedford et al. Bedford describes an olive preservation process wherein olives are submerged in water maintained at a temperature ranging from 32 degrees F. to 50 degrees F. Olives, however, are different from citrus fruits in that they do not contain juice sacs and rag. Rather, olives are a firm fruit having a single-stone seed.

Babbitt, in U.S. Pat. No. 496,376, discloses a method for protecting the buds of fruit trees. The limbs of the fruit trees are sprayed with water when the temperature has fallen below the freezing point of water. The water encases the limbs and the buds in an ice coating. This coating protects the buds, for a very short period of time, from such extreme low temperatures as would destroy the fruit buds. This patent, however, does not address the storage and preservation of picked citrus fruits.

It is an object of the present invention to provide a method for storing and preserving fruits that are characterized by having juice sacs and rag for extended time periods whereby the food quality flavor of the internal juices are maintained and the external appearance does not deteriorate.

SUMMARY OF THE INVENTION

According to a first aspect of the present invention, there is provided a method for preserving fruits characterized by juice sacs and rag comprising the steps of placing the fruits in a holding tank, submerging the fruits in a liquid having a freezing point higher than that of the fruits, and freezing the liquid such that the temperature of the liquid is maintained above the freezing point of the fruits.

According to a second aspect of the present invention, a method for preserving fruits characterized by juice sacs and rag is provided, comprising the steps of placing the fruits in a holding tank, submerging the fruits in a liquid having a freezing point higher than that of the fruits, and chilling the liquid such that the temperature of the liquid is maintained above its freezing point.

According to a third aspect of the present invention, a method for preserving citrus fruits is provided, comprising placing the citrus fruits in a holding tank, submerging the citrus fruits in water, and freezing the water such that the water temperature remains above the freezing point of the citrus fruits.

According to a fourth aspect of the present invention, an apparatus for preserving fruits characterized by juice sacs and rag is provided, comprising a holding tank capable of holding citrus fruits, the holding tank comprising an inlet, a hatch and an outlet, a vent connected to the holding tank outlet, and a refrigeration system in thermal contact with the holding tank for maintaining the submersion liquid at a temperature between the freezing point of the fruits and the freezing point of the submersion liquid.

According to a fifth aspect of the present invention, a method for preserving citrus fruits is provided, comprising placing the citrus fruits in a holding tank, submerging the citrus fruits in water, and chilling the water such that the water temperature is maintained close to 32 degrees F.

According to a sixth aspect of the present invention, a method for preserving fruits characterized by juice sacs and rag is provided, comprising the steps of providing a holding tank, providing fruits in the holding tank, filling the holding tank with a liquid, providing a refrigeration system to freeze the liquid, providing a defrosting system to unfreeze the liquid when the fruits are desired, and removing the fruits from the holding tank.

DETAILED DESCRIPTION OF THE PRESENTLY PREFERRED EMBODIMENTS

Figure 1:
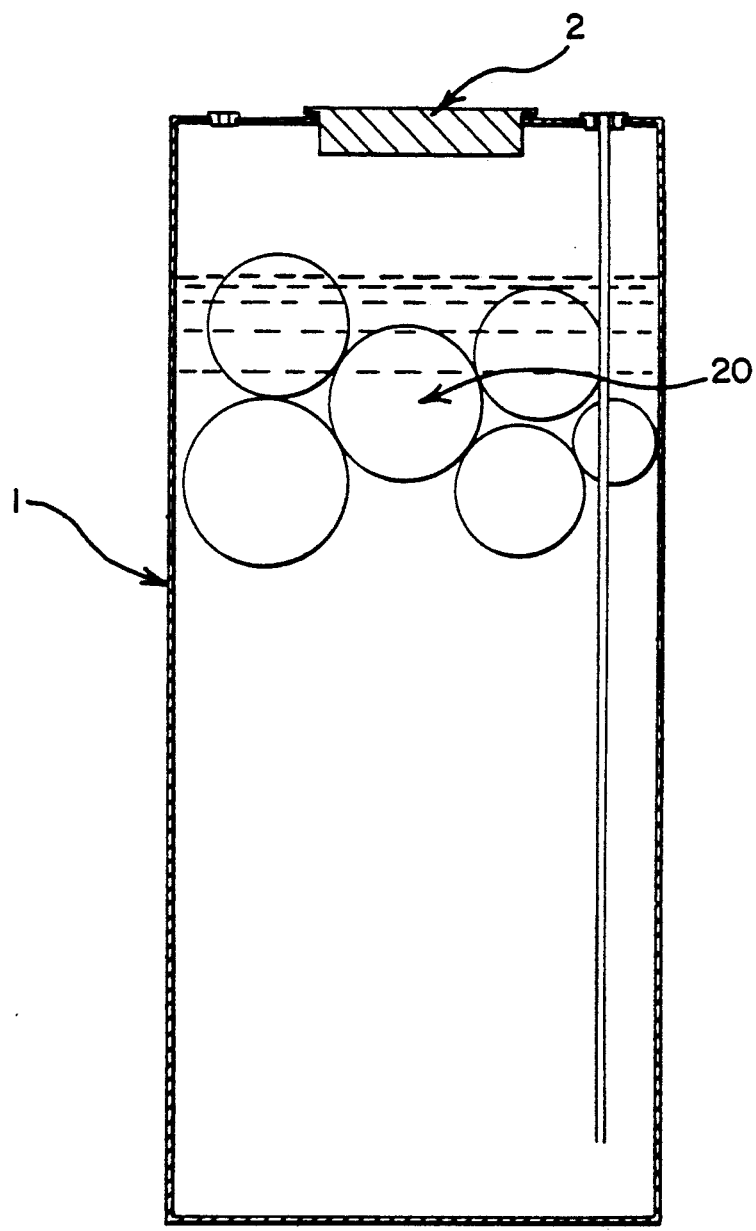
FIG. 1 is an elevational view of a fruit preservation apparatus made in accordance with a first embodiment of the present invention.

The apparatus shown in FIG. 1 comprises a holding tank 1 having a sealed cover 2. The cut-away portion of FIG. 1 reveals fruits 20 situated within the holding tank 1. The holding tank 1 is a non-insulated, pressurized 5-gallon container approximately 9" in diameter by 20" in height.

Figure 2:
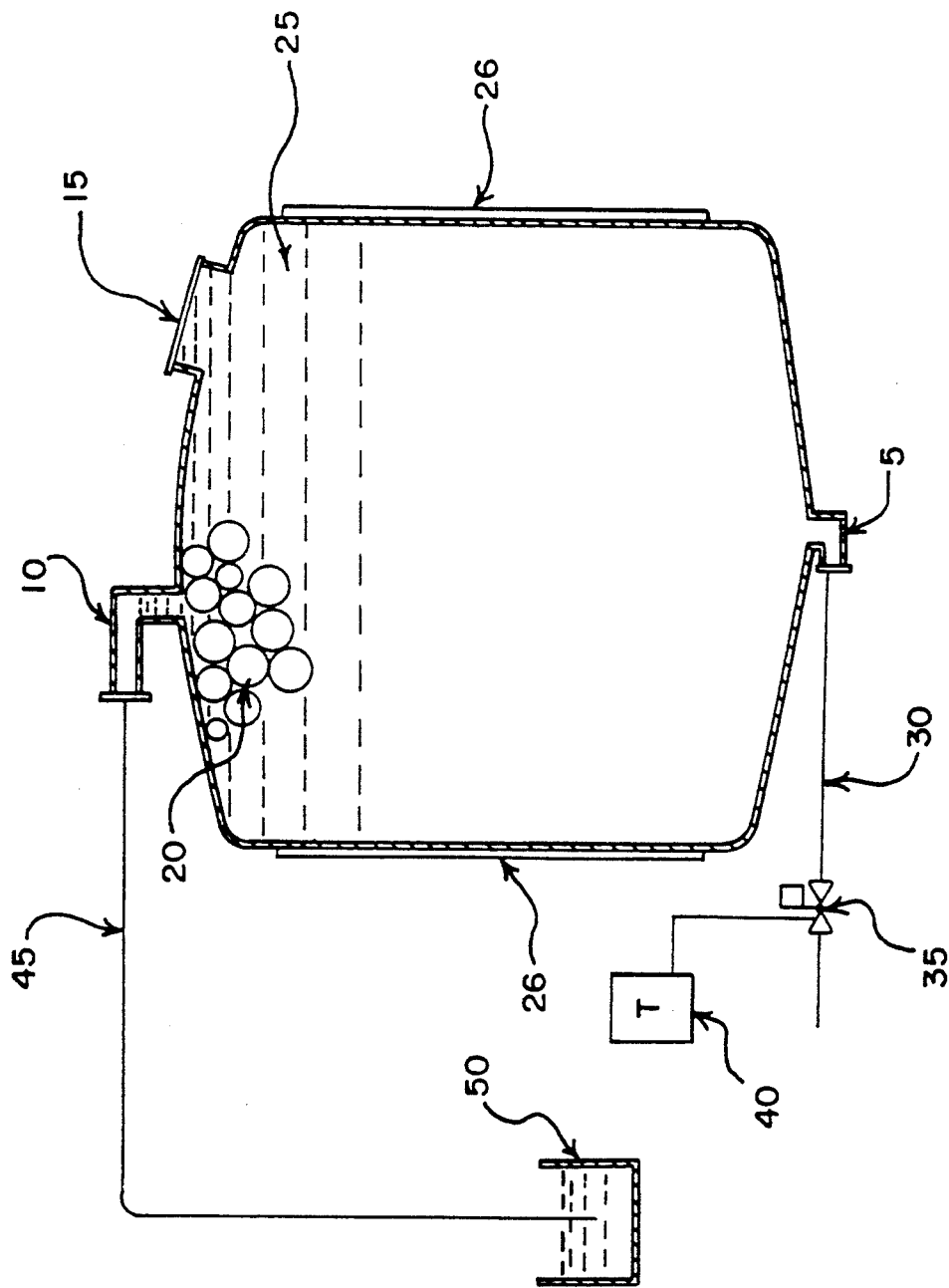
FIG. 2 is an elevational view of a fruit preservation apparatus made in accordance with a second embodiment of the present invention.

The apparatus shown in FIG. 2 comprises a sanitized holding tank 1 having an inlet 5, an outlet 10 and a hatch 15.

Fruits 20 are placed in the holding tank 1. In a preferred embodiment, the fruits 20 are whole oranges that are freshly picked. The fruits 20 to be preserved are brush-washed and sanitized, preferably with no wax being applied, and placed in the holding tank 1, via the hatch 15, until the holding tank 1 is full. A submersion liquid 25 is poured into the holding tank 1, via the hatch 15, until the fruits 20 are completely submerged in the submersion liquid 25. In a preferred embodiment of the present invention, the submersion liquid 25 is tap water, but any suitable liquid not injurious to the fruits 20 or people may be used. The hatch 15 is then closed. The air remaining in the holding tank 1 is removed by filling the holding tank 1 with water, via the outlet 10. The air is removed to prevent microorganisms present in the air from causing the fruits 20 to spoil.

The holding tank 1 is placed in thermal contact with a refrigeration system (not shown), either through actual contact with refrigeration coils 26 or, in a preferred embodiment, by being placed in a refrigerated warehouse (not shown). After the fruits 20 are submerged in the holding tank 1, the refrigeration system chills or freezes the submersion liquid 25. In this preferred embodiment, the submersion liquid has a freezing point higher than that of the fruits. Then, the submersion liquid is brought to a temperature such that the submersion liquid is at or below its freezing temperature but above the freezing point of the citrus fruits. For example, in a preferred embodiment in which the submersion liquid is tap water, the water ice temperature is maintained between 29 and 32 degrees F.

(In an alternative embodiment, the submersion liquid may be maintained somewhat above its freezing point, for example, in this alternative embodiment, if the submersion liquid is water, it is maintained at between 33 and 34 degrees F.)

The fruits 20 are then maintained submerged under these conditions continuously until such time as the fruits are desired. When the fruits 20 are desired, the submersion liquid 25 is released from the holding tank 1 and the fruits 20 are taken from the holding tank 1, via the hatch 15. If the submersion liquid 25 had been frozen, the holding tank 1 must first be defrosted. Defrosting may be achieved by simply turning the refrigeration system off or, if desired, by a heating system placed (not shown) in thermal contact with the holding tank 1. The fruits 20 may be stored and preserved in the holding tank 1 in this manner for a period of up to 18 weeks.

In another alternative embodiment of the present invention, a gas line 30 is connected to the inlet 5 to provide for the injection of preservative gases (not shown) into the holding tank 1 before or during the period of storage. The preservative gases may be chosen from any of those gases known to increase the storage life, internal quality, and appearance of fruits. $CO_2$ and $N_2O$ are preferred preservative gases.

The preservative gas, or gases, chosen to be injected into the holding tank 1 is injected until its solubility point in the submersion liquid 25 is reached. The inlet 5 is placed on the bottom of the holding tank 1 because the equilibrium concentration of the preservative gases in the submersion liquid 25 is better attained and maintained if the gases are injected into the bottom of the holding tank 1. A valve 35 is placed on the gas line 30 so that the gas flow into the holding tank 1 may be regulated.

Some of the preservative gases may be injected or dissolved into the submersion liquid before the liquid is refrigerated to its storage temperature, or alternatively, the preservative gas may be injected or dissolved periodically during the duration of the storage period. A timer 40 may be connected to the valve 35 to open the valve 35 at periodic intervals to permit the injection of preservative gases into the holding tank 1. Periodic injections are performed in order to maintain the equilibrium concentration of the preservative gases in the submersion liquid 25. Typically, these injections are performed on a bi-weekly basis.

In another preferred embodiment of the present invention, a vent 45 is connected to the outlet 10 to direct the release of liquid and gas from the holding tank 1 to a reservoir 50. The reservoir 50 collects the liquid and gas released from the holding tank 1.

It is intended that the foregoing detailed description be regarded as illustrative rather than limiting and that it is understood that the following claims including all equivalents are intended to define the scope of the invention.

We claim:

1. A method for preserving citrus fruits, which comprises:
   a) placing the citrus fruits in a holding tank;
   b) submerging the citrus fruits in water; and
   c) freezing the water to ice such that the water temperature remains above the freezing point of the citrus fruits.

2. The method for preserving citrus fruits as claimed in claim 1, further comprising dissolving preservative gases in the water before the water is frozen in order to increase the storage life and internal quality of the citrus fruits.

3. The method for preserving citrus fruits as claimed in claim 2 wherein the preservative gases are selected from the group consisting of $CO_2$ and $N_2O$.

4. The method for preserving citrus fruits as claimed in claim 1 wherein the citrus fruits are oranges.

5. The method for preserving citrus fruits as claimed in claim 1 wherein the water temperature is maintained between 29 and 32 degrees F.

6. The method for preserving citrus fruits as claimed in claim 1 wherein the citrus fruits are maintained submerged in the water for approximately 18 weeks without any harmful effects.

7. The method for preserving citrus fruits as claimed in claim 6 wherein the citrus fruits are continuously submerged in the water.

8. The method for preserving citrus fruits as claimed in claim 6 wherein the citrus fruits are removed from the water after a period of time up to 18 weeks.

9. A method for preserving citrus fruits, which comprises:
   a) placing the citrus fruits in a holding tank;
   b) submerging the citrus fruits in water;
   c) chilling the water such that the water temperature is maintained above 32 degrees F.; and
   d) maintaining the citrus fruits submerged in the water for an extended period of time.

10. The method for preserving citrus fruits as claimed in claim 9, further comprising dissolving preservative gases in the water in order to increase the storage life and internal quality of the citrus fruits.

11. The method for preserving citrus fruits as claimed in claim 9 wherein the preservative gases are selected from the group consisting of $CO_2$ and $N_2O$.

12. The method for preserving citrus fruits as claimed in claim 9 wherein the preservative gases are periodically injected into the holding tank and dissolved in the water.

13. The method for preserving citrus fruits as claimed in claim 9 wherein the citrus fruits are oranges.

14. The method for preserving citrus fruits as claimed in claim 9 wherein the water temperature is maintained between 33 and 34 degrees F.

15. The method for preserving citrus fruits as claimed in claim 9 wherein the citrus fruits are maintained submerged in the water for approximately 18 weeks without any harmful effects.

16. A method for preserving fruits characterized by juice sacs and rag, which comprises:
   a) placing the fruits in a holding tank;
   b) submerging the fruits in a liquid having a freezing point higher than that of the fruits; and
   c) freezing the liquid to a solid state such that the temperature of the frozen liquid is maintained above the freezing point of the fruits.

17. The method for preserving fruits characterized by juice sacs and rag as claimed in claim 16 wherein the liquid is water.

18. The method for preserving fruits characterized by juice sacs and rag as claimed in claim 16, further comprising dissolving preservative gases in the liquid before the liquid is frozen in order to increase the storage life and internal quality of the fruits.

19. The method for preserving citrus fruits as claimed in claim 18 wherein the preservative gases are selected from the group consisting of $CO_2$ and $N_2O$.

20. The method for preserving fruits characterized by juice sacs and rag as claimed in claim 16 wherein the citrus fruits are maintained submerged in the liquid for approximately 18 weeks without any harmful effects.

21. A method for preserving fruits characterized by juice sacs and rag, which comprises:
   a) placing the fruits in a holding tank;
   b) submerging the fruits in a liquid having a freezing point higher than that of the fruits;
   c) chilling the liquid such that the temperature of the liquid is maintained above its freezing point; and
   d) maintaining the citrus fruits submerged in the liquid for an extended period of time.

22. The method for preserving fruits characterized by juice sacs and rag as claimed in claim 21 wherein the liquid is water.

23. The method for preserving fruits characterized by juice sacs and rag as claimed in claim 21, further comprising dissolving preservative gases in the liquid in order to increase the storage life and internal quality of the fruits.

24. The method for preserving citrus fruits as claimed in claim 23 wherein the preservative gases are selected from the group consisting of $CO_2$ and $N_2O$.

25. The method for preserving citrus fruits as claimed in claim 23 wherein the preservative gases are periodically injected into the holding tank and dissolved in the liquid.

26. The method for preserving fruits characterized by juice sacs and rag as claimed in claim 21 wherein the citrus fruits are maintained submerged in the liquid for approximately 18 weeks without any harmful effects.

27. A method for preserving fruits characterized by juice sacs and rag, which comprises the following steps:
   a) providing a holding tank;
   b) providing fruits in the holding tank;
   c) filling the holding tank with a liquid in order to submerge the fruits;
   d) providing a refrigeration system to freeze the liquid to a solid state;
   e) providing a defrosting system to unfreeze the liquid when the fruits are desired; and
   f) removing the fruits from the holding tank.

28. The method of preserving fruits having juice sacs and rag as claimed in claim 27, further comprising the step of providing preservative gases to dissolve in the liquid before the liquid is frozen.

* * * * *